3,291,212
PROCESS FOR TREATING EARTH FORMATIONS TO BE RELATIVELY IMPERMEABLE TO FORMATION WATER
Dixon W. Peacock, Bartlesville, Okla., assignor to Phillips Petroleum Company, a corporation of Delaware
No Drawing. Filed May 27, 1963, Ser. No. 283,607
7 Claims. (Cl. 166—32)

This invention relates to the treatment of earth formations. In one aspect, the invention relates to a method for sealing a permeable earth formation to prevent the flow of formation water into an oil well bore. More particularly, the invention relates to the treatment of earth formations where it is desired that such formations shall be made relatively impermeable to formation water.

Oil is produced from several different types of permeable earth formations considerably removed from the earth's surface and reached by a well bore through which normal production takes place. If high pressure exists in the productive zone, oil will flow to the surface; otherwise the oil is brought to the surface by means of mechanical devices such as pumps, gas lifts, and the like.

The well bore passes through many different formations before reaching the oil-producing area. Some of these formations are water-bearing. The steel casing which is placed in the well and cemented into position with Portland cement usually prevents these waters from reaching the oil productive zone and interfering with oil production although they are the source of occasional trouble.

In the majority of the oil fields, there lies directly below the oil-bearing horizon a salt water zone at pressures equivalent to those found in the oil horizons. It is these underlying waters that are the source of frequent trouble. If a well bore is drilled too deep and breaks through the oil horizon into the underlying water zone, water will enter the well bore in ever increasing amounts. The waters that enter the bore hole have a tendency to emulsify with the oil to a degree that will vary considerably in different localities. Some of these emulsions are easily broken and some are extremely difficult. In practically all cases, the emulsions must be heated and chemically treated to get water separation in the production of "pipeline oil."

Other disadvantages associated with the production of oil and water mixtures are increased pumping costs, salt water corrosion equipment requirements, salt water disposal costs, and the like.

Various compositions have been suggested and tried to seal off the entering water and thereby recover greater quantities of the oil held by the productive horizons. Included among these materials are thermoplastic resins, gel-forming materials, resin-forming liquids, thermosetting resins and inorganic cements.

It is an object of the invention to provide a method for the treatment of earth formations.

It is another object of the invention to provide a method for sealing permeable earth formations.

Yet another object of the invention is to provide a method for preventing the penetration of formation water into the oil well bore.

Yet another object of the invention is to provide a method of using a novel composition for the sealing of earth formations.

These and other objects of the invention will be readily apparent to those skilled in the art from the accompanying disclosure and claims.

These objects are broadly accomplished by introducing into the water-containing earth formation an additive, diluting said additive in situ with water of a reduced pH so as to precipitate said additive in the formation, said additive being a tannin, particularly those selected from the group consisting of flavotannins, gallotannins and mixed tannins.

It has now been discovered that the above additives are adaptable for sealing off water-containing earth formations to prevent the flow of water into the oil well bore by regulation of the pH of the carrier medium.

Although a wide variety of tannins are suitable for sealing the earth formations, the following tannins are included in the above-identified groups.

Group (A): These flavotannins may be synthetic or naturally occurring such as those found in plants such as gambier, catechu, quebracho, tizerah, urunday, wattle, mangrove, spruce, hemlock, larch, willow, avaram, Chinese rhubarb, guarana, mahogany, birch, wild cherry, horse chestnut, hottentot fig, ironwood, and teak. A particularly preferred flavotannin is quebracho which is obtained from the dried wood or bark, or dried extract of such wood or bark, of the aspidosperma quebracho blanco or the quebracho lorentzi tree. Quebracho is readily available commercially.

Group (B): These gallotannins may be synthetic or naturally occurring such as sumac tannin and the tannins of valonia oak gall, tea, tara or carabin, valoni fruit cups and beard, myrabolam nuts, divi-divi pods, algarobilla pods, oak wood, bark, and leaves, chestnut wood, bark, and leaves, cloves, dhawa, guarana, mangue takaout, pomegranate, water lily, hornbeam, bistort, guayacan, and cascalote.

Group (C): The so-called mixed tannins are also applicable such as bablah, badan, Cyprus sumac, filao, maletto, and wandoo.

In another embodiment of the invention, high pH water is introduced through the bore into the formation under sufficient pressure to force the formation water out of the formation being treated, thereafter a high pH additive solution is introduced into the formation through the bore and thereafter the pH of the additive solution is lowered in situ to precipitate the additive in the formation thus shutting off the flow of water from the formation into the bore.

In a third embodiment of the invention, the high pH water is introduced into the bore to force the salt water out, a high pH additive solution is introduced into the formation thus vacated by the salt water and thereafter a low pH water is introduced into the formation followed by a reduction in the injection pressure so as to permit the additive to flow back toward the bore through the formation previously occupied by the low pH water so as to precipitate the additive.

It has been found that the above-identified additives are soluble in water and the like so long as the pH is maintained above certain minimum values. When the pH is lowered below these minimum values, the additive begins to precipitate. Thus, by maintaining the initial slug of water into the formation at a high pH and maintaining the pH of the additive slug at a high pH, no precipitation occurs. However, upon release of the injection pressure so as to permit the additive solution to flow back into the formation formerly occupied by the low pH water, the tannin is thus precipitated by the reduction of pH, thus sealing the formation against further penetration of the formation water. Also, the formation water will assist in the lowering of the pH of the additive solution.

The additive solution may be introduced into the formation in any suitable manner so long as the pH of the solution in the formation is initially above the pH at which the additive precipitates. The precipitation of the additive in situ can be effected in a variety of ways. As above described, the additive or tannin may be precipitated by permitting the formation water to seep into the formation occupied by the tannin solution thereby diluting the additive solution, thus lowering the pH to a point where the additive precipitates. In addition, the tannin may be precipitated by lowering the injection pressure as above described. In another method, the injection of the initial slug of high pH water results in a lowering of its pH by dilution with formation water so that when the additive solution is injected, the additive precipitates in the formation. In order to force the addition solution into the formation, the solution slug is immediately followed by a second slug of water, or buffer slug, preferably maintained at a higher pH so as to prevent precipitation of the additive at the interface of the second water slug and the additive slug. This second water slug may then be followed by a third water slug, which does not require adjustment of pH, so as to force the additive slug into the formation. The third water slug may be used to dilute the additive in the formation thereby lowering the pH to a point where the additive precipitates.

Preferably, the initial water slug has a pH of at least 0.5 pH units greater than the pH of the additive. Preferably, the additive slug has a pH in the range of 8 to 12, more preferably 9 to 10, while the water slugs, both the initial and the one immediately trailing the additive slug have a pH in the range of 9 to 14, more preferably 10 to 12. The third water slug does not require pH adjustment unless it is used to precipitate the tannin when the pH is low enough to precipitate the tannin. This pH requirement for precipitation varies with the additive, additive concentration, the type of formation water and the like. The point at which precipitation begins to occur depends on the beginning pH, for example, if the initial pH is 12, some precipitation will occur as soon as the pH is lowered—even to 11.8. The pH should not be so low as to result in detrimental effects to the oil-bearing strata. Generally, the additive solution is lowered to a pH of less than 8.0, preferably 3 to 7.8, to precipitate at least most of the tannin.

The pH of the solution may be adjusted by the addition of a base, for example, an alkali metal hydroxide such as sodium hydroxide, ammonium hydroxide, or an alkali metal carbonate if the carbonate does not react with the mineral constituents of the reservoir.

The concentration of the additive in solution is generally in the range of 0.1 to 10 weight percent. The solvent may be any material not detrimental to the oil-bearing strata but is preferably water due to its low cost and availability. It is sometimes helpful to include in the additive slug a reducing agent which will aid in the solubilizing and maintaining of the additive in solution, for example, an alkali metal sulfite such as sodium sulfite, sodium bisulfite, sodium hydrosulfite, ammonium sulfite, sulfur dioxide, or the like. Although the mechanism is unknown, it is believed that the reducing agent also assists in the inhibition of the polymerization of some of the polymerizable additives.

The reducing agent is employable in an amount in the range of 2 to 50 weight percent, preferably 5 to 20 weight percent, based on the additive.

In conjunction with the method of the invention, it is also within the scope of the invention to use a solvent flood in advance of the water flood. Steam or hot water is also employable. It is also within the scope of the invention to include a detergent or wetting agent along with the additive of the invention.

The word "water" as used in this specification and the appended claims is taken to include the various aqueous materials which are suitable for injection into an oil-containing formation and further includes aqueous solutions, such as saline waters, which may conveniently be disposed of by injection into a subterranean formation.

The means of determining the location of the water permeable zone is no part of the present invention as such means are old and well known.

In a specific embodiment of the invention, a slug of water having a pH of 11 is pumped into the aquifer in an amount sufficient to penetrate the formation to a distance of five feet around the well bore. A slug of quebracho solution of about twice the volume of initial water is pumped into the formation. The aqueous quebracho solution has a pH of 10 and a concentration of 3 weight percent. A second slug of water having a pH of 11 equal to the size of the first water slug is then introduced into the formation followed by water of about a pH 7 until the pressure build-up indicates that a plug is secured.

While certain examples, processes, structures and compositions have been described for purposes of illustration, the invention is not limited to these. Variation and modification within the scope of the disclosure and the claims can readily be effected by those skilled in the art.

I claim:

1. A method for treating a permeable earth formation containing oil and water which penetrate the formation and enter the oil well bore comprising introducing a high pH water through said bore into the formation under sufficient pressure to force the formation water back out of the formation being treated, thereafter introducing a high pH additive solution into said formation through said bore, and thereafter lowering the pH of said additive solution in situ so as to precipitate said additive in the formation, said additive solution being a solution of tannin, said high pH of said high pH water being sufficiently high to prevent precipitation of the tannin from solution.

2. A method for treating a permeable earth formation containing oil and water which penetrate the formation and enter the oil well bore comprising introducing a high pH water slug through said bore into the formation under sufficient pressure to force at least a portion of the formation water back out of the formation being treated, the pH of said formation water being lower than the pH of said high pH water slug, and lowering the pH of the high pH water slug by mixing with said formation water, thereafter introducing a high pH aqueous additive solution slug into said formation through said bore, thereby lowering the pH of said additive solution in situ by dilution with the previously formed mixture of said high pH water and, said water in said formation to a pH sufficiently low to precipitate said additive in the formation thus shutting off flow of water from the formation into the bore, the pH of said additive solution being sufficiently high to prevent precipitation of the additive, said additive selected from the group consisting of flavotannins, gallotannins and mixed tannins.

3. A method for treating a permeable earth formation containing oil and water which penetrate the formation and enter the oil well bore comprising introducing water having a pH in the range of 8 to 12 through said bore into the formation under sufficient pressure to force formation water back out of the formation being treated, thereafter introducing an aqueous tannin solution having a pH in the range of 9 to 14 into said formation through said bore, and thereafter introducing water having a pH lower than that of the additive solution into said formation through said bore so as to contact and dilute said additive solution thereby lowering the pH to a value sufficient to precipitate the additive in the formation thus shutting off the flow of water from the formation into the bore, said tannin being selected from the group consisting of flavotannins, gallotannins and mixed tannins.

4. A method for treating a permeable earth formation containing oil and water which penetrate the formation and enter an oil well bore comprising introducing water having a pH of 10 to 12 through said bore into the formation under sufficient pressure to force the formation water back out of the formation being treated, thereafter introducing through said bore an aqueous quebracho solution having a pH of 9 to 10 and at least 0.5 pH units less than said aforementioned water, thereafter introducing water through said bore having a pH of 10 to 12 followed immediately by water having a pH of less than that of the additive solution and sufficient to contact and dilute said quebracho solution to a pH less than 8 and sufficient to precipitate substantially all of said quebracho in the formation thus shutting off the flow of water from the formation into the bore.

5. A method for treating a permeable earth formation containing oil and water which penetrate the formation and enter the oil well bore comprising introducing high pH water through said bore into the formation under sufficient pressure to force the formation water back out of the formation being treated, introducing a high pH tannin solution into said formation through said bore, introducing a low pH water into said formation through said bore thus forcing the tannin further into said formation buffered by high pH water between the tannin solution and the low pH water, said high pH being sufficiently high to prevent precipitation of the tannin from solution and said low pH being sufficiently low to cause precipitation of said tannin in situ, and thereafter reducing the injection pressure to permit the tannin solution to flow back toward the bore through the formation previously occupied by the low pH water so as to thus dilute the tannin solution and reduce the pH sufficiently to precipitate the tannin in the formation.

6. A method for treating a permeable earth formation containing oil and water which penetrate the formation and enter the oil well bore comprising introducing water having a pH in the range of 9 to 14 through said bore into the formation under sufficient pressure to force the formation water back out of the formation being treated, thereafter introducing an aqueous additive solution having a pH in the range of 8 to 12 into said formation through said bore, thereafter introducing water having a pH lower than that of the additive solution and sufficient to reduce the pH of said solution to the range of 3 to 8 into said formation through said bore thus forcing the additive solution further into said formation, and thereafter reducing the injection pressure to permit the additive solution to flow back toward the bore through the formation previously occupied by the low pH water so as to precipitate said additive thus shutting off the flow of water from the formation into the oil well, said additive being selected from the group consisting of flavotannins, gallotannins and mixed tannins.

7. The process of claim 6 wherein said additive comprises quebracho.

References Cited by the Examiner

UNITED STATES PATENTS 2,238,930    4/1941    Chamberlain et al.

OTHER REFERENCES

Rogers, W. F.: Composition and Properties of Oil Well Drilling Fluids, Gulf Publishing Co., Houston, Texas, 1948, first edition, pages 290 through 293 relied on.

CHARLES E. O'CONNELL, *Primary Examiner.*

T. A. ZALENSKI, *Examiner.*

S. J. NOVOSAD, *Assistant Examiner.*